Sept. 5, 1944.  W. R. SAMSON  2,357,693
ASSEMBLING APPARATUS
Filed May 2, 1942  5 Sheets-Sheet 2
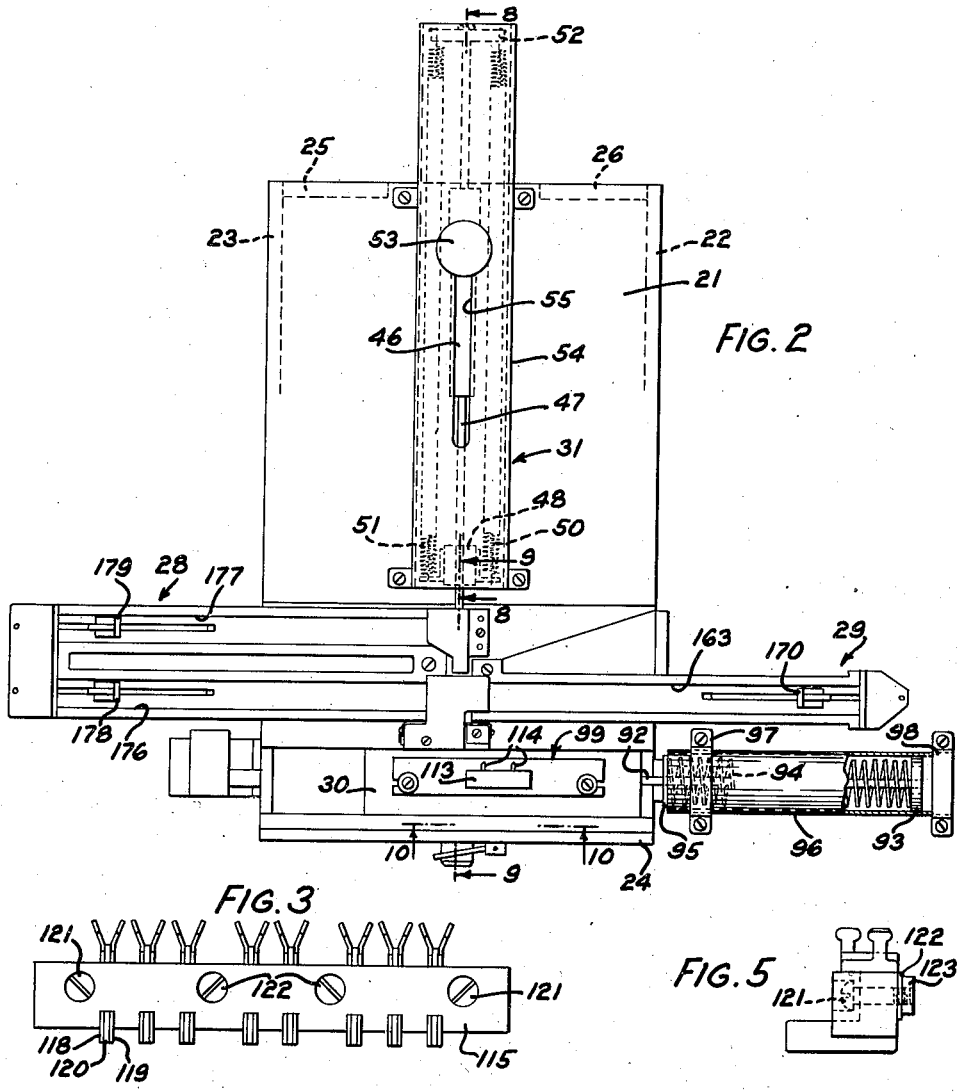
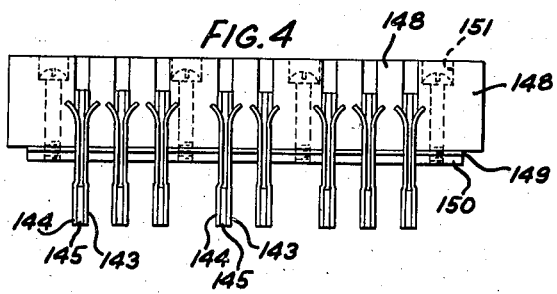
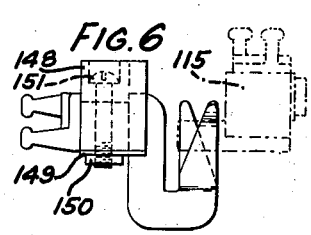
INVENTOR
W. R. SAMSON
BY
ATTORNEY Sept. 5, 1944.   W. R. SAMSON   2,357,693
ASSEMBLING APPARATUS
Filed May 2, 1942   5 Sheets-Sheet 3
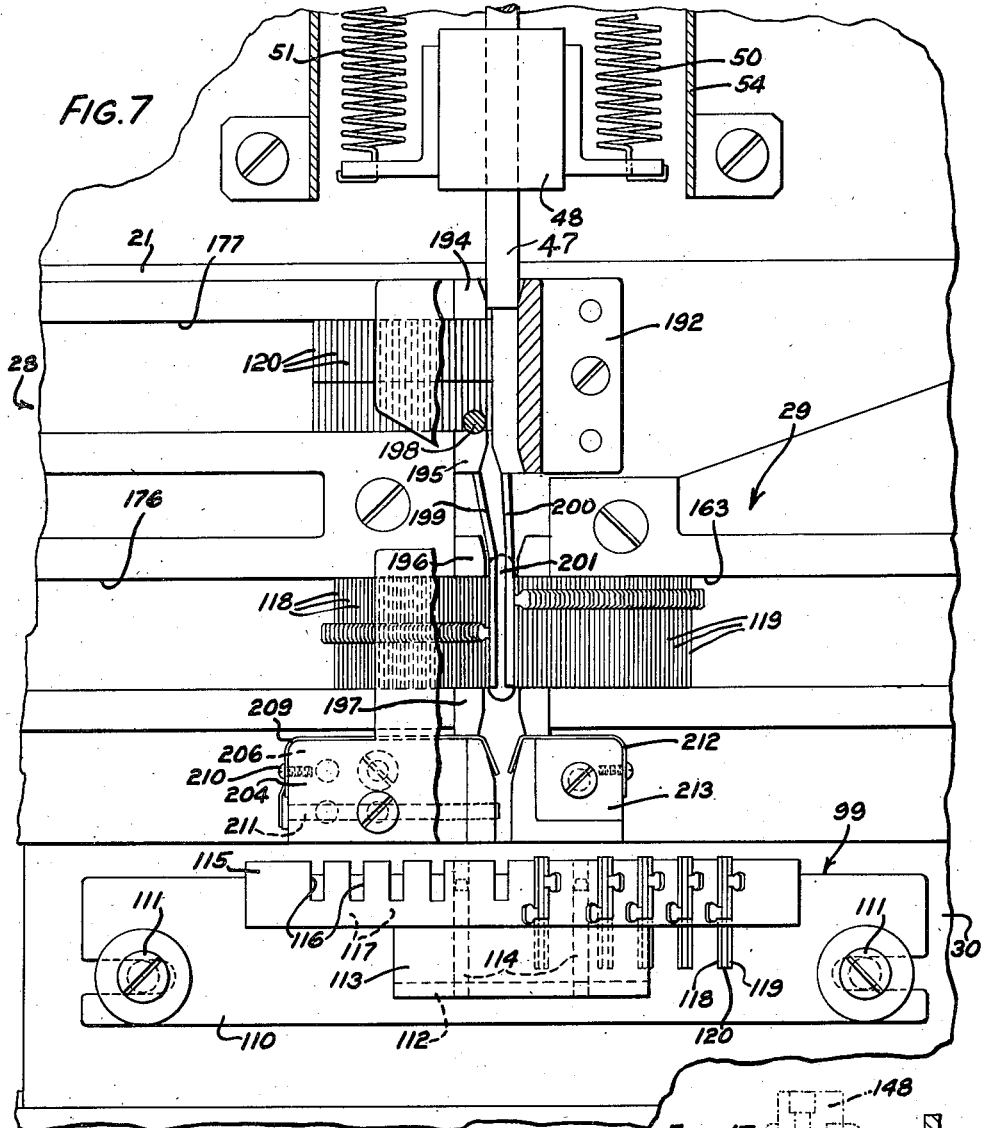
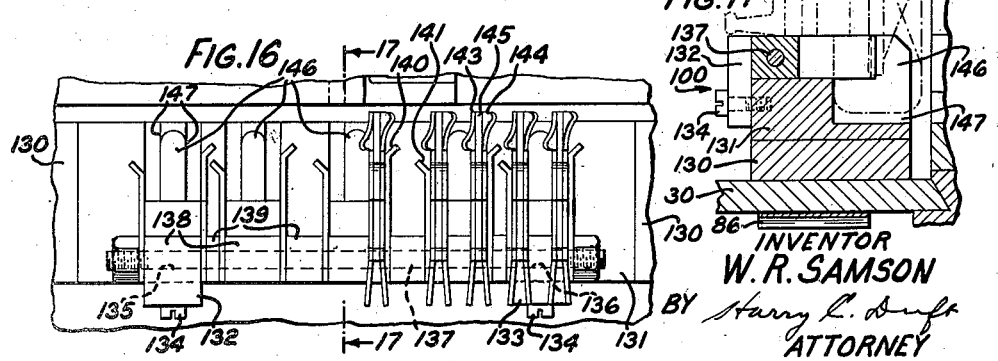
INVENTOR
W. R. SAMSON
BY Harry L. Duft
ATTORNEY

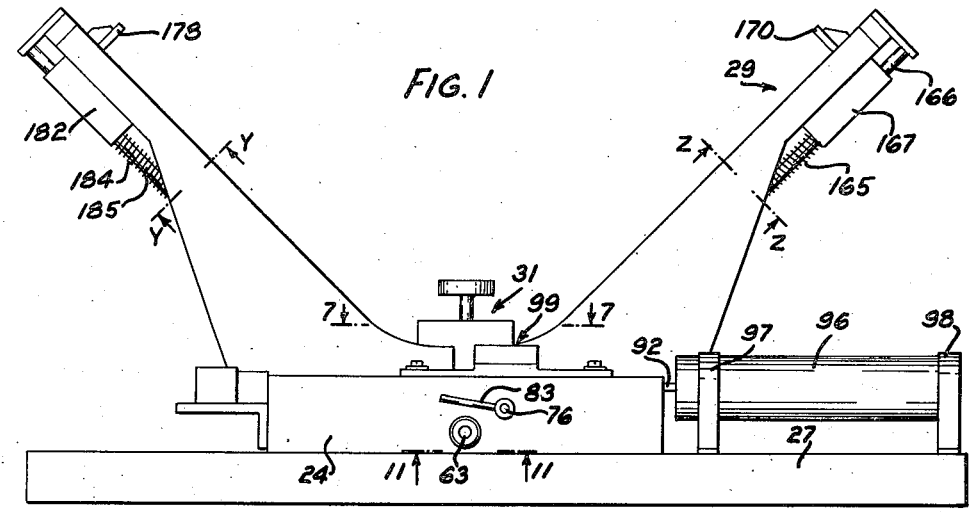
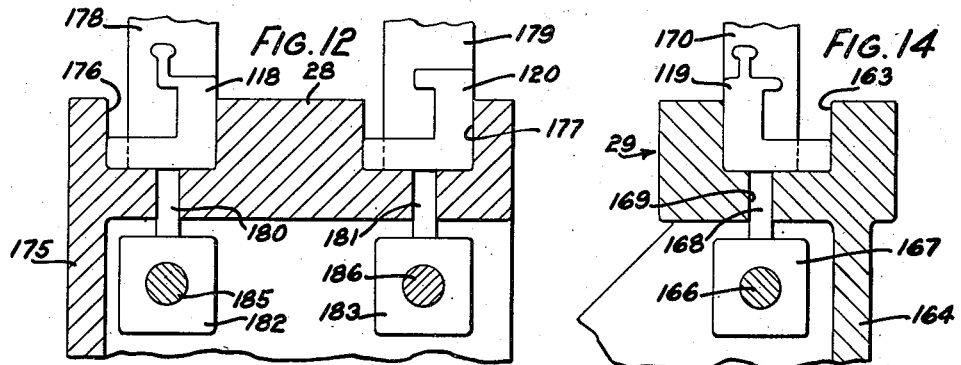
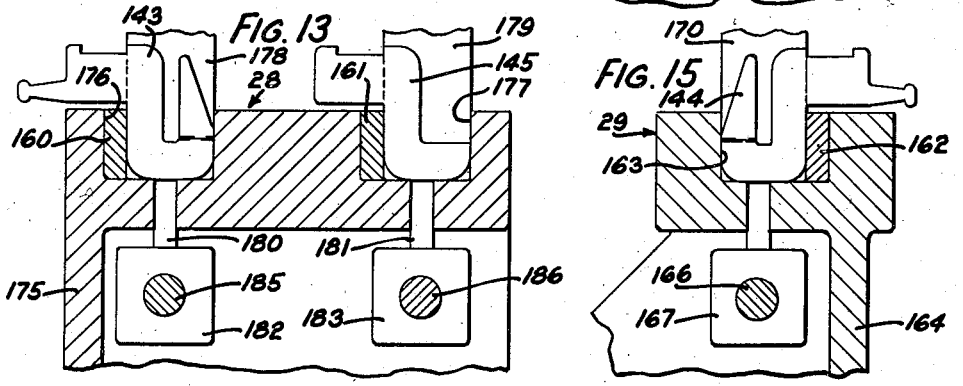

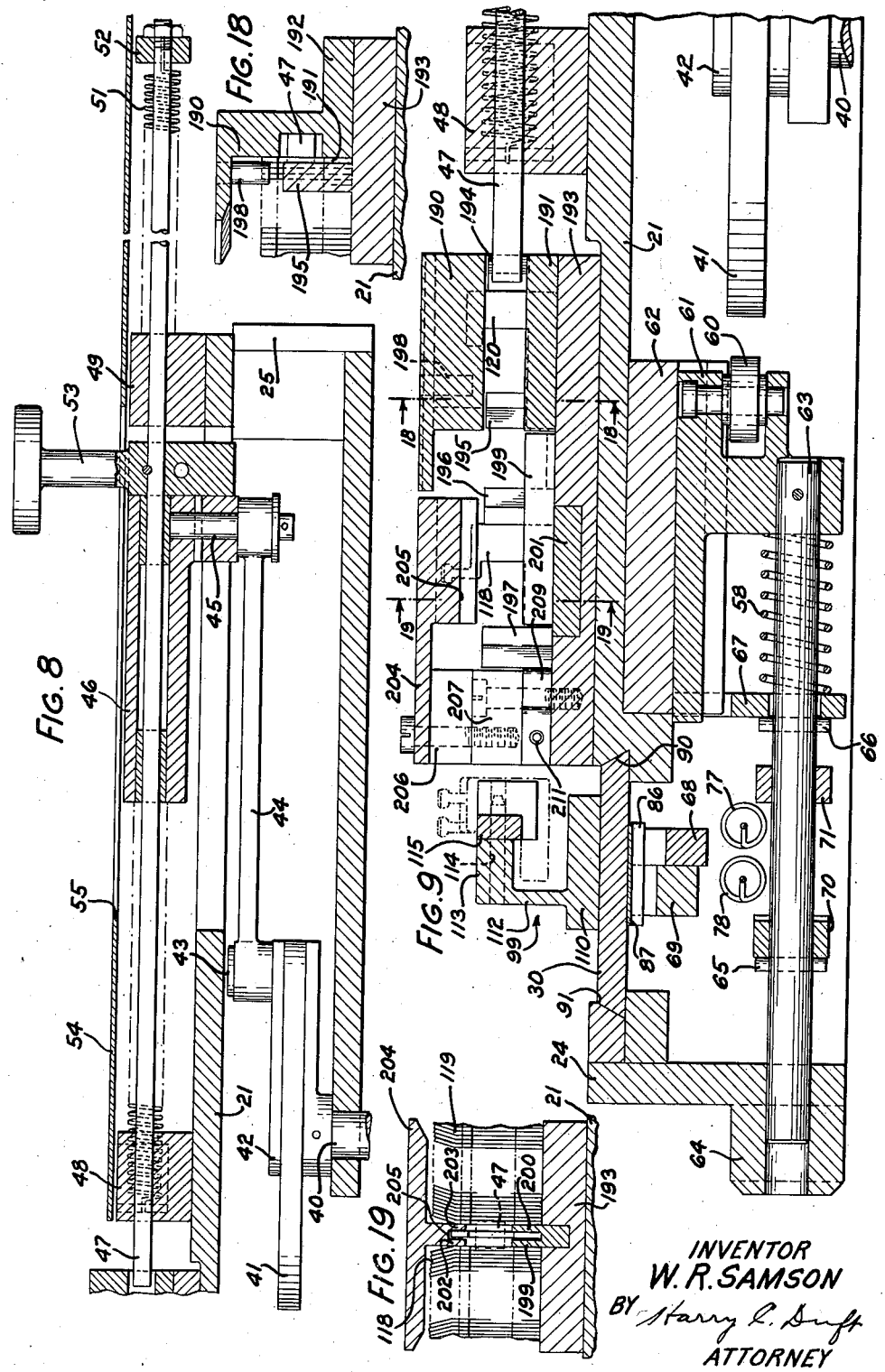

Sept. 5, 1944.    W. R. SAMSON    2,357,693
ASSEMBLING APPARATUS
Filed May 2, 1942    5 Sheets-Sheet 5

INVENTOR
W. R. SAMSON
BY *Harry L. Swift*
ATTORNEY

Patented Sept. 5, 1944

2,357,693

UNITED STATES PATENT OFFICE 2,357,693

ASSEMBLING APPARATUS

Walter R. Samson, Chicago, Ill., assignor to Western Electric Company, Incorporated, New York, N. Y., a corporation of New York Application May 2, 1942, Serial No. 441,455

6 Claims. (Cl. 29—203)

This invention relates to assembling apparatus and more particularly to apparatus for assembling metallic and electrical insulating parts of plugs and jacks.

It is an object of the present invention to provide a simple and efficient apparatus for quickly assembling irregularly shaped parts into units.

In accordance with one embodiment of the invention, which is particularly adapted to assemble plugs and jacks for use in making relatively permanent connections in telephone exchanges, there is provided a carriage on which, in the case of the plugs, the main member of the plug assembly may be supported for travel across the front of the apparatus. In assembling jacks due to the configuration of some of the parts, a jig or fixture is mounted on the carriage for receiving the various smaller parts of the jack and the main member of the assembly is later assembled with the parts on the fixture. In both the plug and jack, groups of connecting members comprising an insulator and two metallic connector members are to be mounted in slots in a main member of the assembly. The apparatus is provided with three magazine sections, two of the sections being at one side of the machine and one at the other side, for feeding two metallic members with an insulator between them from separate magazine sections to an assembling point. Due to the difference in size and configuration of the metallic members and insulators for the plugs and jacks, spacers are provided which may be inserted in the magazine sections when jacks are being assembled.

The magazines feed the parts to the assembling point at which there are provided suitable guiding devices and an assembling plunger which moves in a direction transverse to the direction of movement of the carriage across the front of the machine. In the operation of the apparatus, the carriage is moved step by step across the front of the machine and each time it steps, it presents a slot on the main member of a plug or the jack fixture mounted on it in alignment with the assembling plunger. When the slot on the plug or fixture is in alignment with the plunger, the plunger is reciprocated to feed two metallic parts and an insulator from separate magazine sections through the guides and into the slot in alignment therewith.

A better understanding of the invention may be had by reference to the following detailed description when considered in conjunction with the accompanying drawings, wherein Fig. 1 is a front elevational view on a relatively small scale of an apparatus constituting a preferred form of the invention;

Fig. 2 is a plan view, also on a relatively small scale, of the apparatus shown in Fig. 1;

Fig. 3 is a plan view of a plug which may be assembled in the apparatus shown in Figs. 1 and 2;

Fig. 4 is a plan view of a jack which may be assembled by means of the apparatus shown in Figs. 1 and 2;

Fig. 5 is a side elevational view of the plug shown in Fig. 3;

Fig. 6 is a side elevational view of the jack shown in Fig. 4;

Fig. 7 is a fragmentary plan view on an enlarged scale of the apparatus shown in elevation in Fig. 1, looking down at a portion of the apparatus along the line 7—7 of Fig. 1 and showing a partially formed plug mounted on a fixture supported by the transversely movable carriage;

Figure 10:
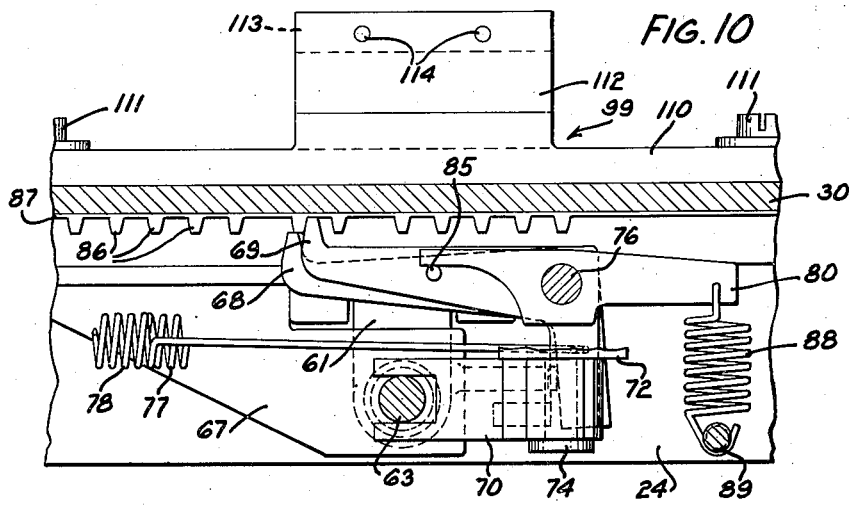
Figure 11:
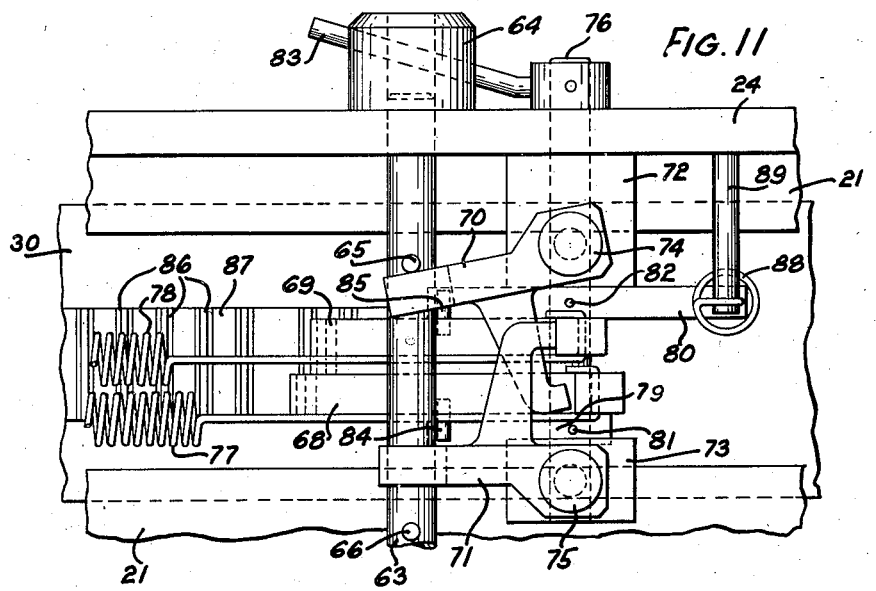

Figs. 8 and 9 are enlarged fragmentary sectional views taken substantially along the lines 8—8 and 9—9, respectively, of Fig. 2, Fig. 8 being drawn on a smaller scale than Fig. 9, and when Fig. 8 is placed at the right of Fig. 9, constitute a transverse sectional view through the center of the machine showing the main actuators for controlling the movement of the carriage and the feeding of insulator members and connector members onto the main insulating member of the plug and jack assemblies. It will be understood that in the assembling of a plug, as pointed out hereinbefore, a jig or fixture receives the insulator members and connector members, whereas, in the assembling of the plug, the insulator members and connector members are fed directly onto the main member of the assembly;

Fig. 10 is a fragmentary sectional view, on a relatively large scale, taken along the line 10—10 of Fig. 2 in the direction of the arrows;

Fig. 11 is a view taken along the line 11—11 of Fig. 1, looking upwardly at the mechanism for controlling the step by step movement of the carriage across the front of the machine in assembling the plugs and jacks;

Fig. 12 is a sectional view taken along the line Y—Y of Fig. 1 in the direction of the arrows and showing the magazine loaded with plug parts;

Fig. 13 is a sectional view also taken along the line Y—Y of Fig. 1 in the direction of the arrows showing the magazine loaded with jack parts;

Fig. 14 is a sectional view taken along the line Z—Z of Fig 1 in the direction of the arrows showing the magazine positioned at the right side of the machine adapted for feeding plug parts;

Fig. 15 is a sectional view also taken along the line Z—Z of Fig. 1 in the direction of the arrows showing the magazine loaded with jack parts to be fed to the assembling position;

Fig. 16 is a fragmentary plan view of a fixture for receiving the insulators and connector members of a jack in position for transference to the main member of a jack;

Fig. 17 is a sectional view taken on the line 17—17 of Fig. 16 in the direction of the arrows; and Figs. 18 and 19 are fragmentary transverse sectional views taken on the lines 18—18 and 19—19 of Fig. 9 in the direction of the arrows.

Referring to the drawings, wherein like reference characters designate the same parts throughout the several views, particular reference being had first to Figs. 1 and 2, the numeral 21 designates a main base plate suitably positioned on side members 22 and 23 and a front plate 24. The framework, comprised of the main base member 21, the side members 22 and 23, front plate 24, and a pair of rear members 25 and 26 may be positioned upon any suitable bench or table 27, which, in turn, may be mounted upon standards (not shown). On the main base member 21, there are positioned two sets of magazines, designated generally by the numerals 28 and 29, the magazine 28 comprising a pair of magazine sections and the magazine 29 having only a single magazine section. In addition to the magazines 28 and 29, supported by the main base member 21, the base member has mounted under it mechanism for controlling the movement of a carriage 30 across the face of the apparatus in timed relation to the operation of a motor driven plunger mechanism, designated generally by the numeral 31 and mounted upon a main base member 21.

Positioned beneath the table 27 are a motor and gear reducer mechanism (not shown) for driving a shaft 40 (Figs. 8 and 9), which has fixed to it a cam 41 and an eccentric plate 42. The eccentric plate 42 has a pin 43 fixed to it for pivotally receiving a link 44. The link 44 is connected at the end thereof away from the pin 43 to a pin 45 fixed to a sleeve 46, which rides on a plunger 47. The plunger 47 is slidable in bearings 48 and 49 and is normally urged to the left (Figs. 8 and 9) by a pair of springs 50 and 51 (Fig. 2), which are attached to the bearing 48 and to a yoke 52, which, as most clearly seen in Fig. 2, is fixed to the rear end of the plunger 47. The plunger 47 has a handle 53 secured to it and normally abutting the right end (Fig. 8) of the sleeve 46, being held against the right end of the sleeve 46 by the springs 50 and 51. Thus, the plunger 47 will tend to follow the sleeve 46 as it is driven through link 44 by the eccentric plate 42 and in the event that any parts become jammed in the apparatus, the plunger will not be damaged by being forced positively against the jammed parts. When any such mishap occurs, the handle 53 may be used to return the plunger to its inoperative position, as shown in the drawings. As seen in Figs. 8 and 2, and the plunger 47, throughout most of its length, and the springs 50 and 51 are enclosed in a suitable covering or casing member 54, which is slotted at 55 to permit movement of the handle 53 with the plunger 47. The cam 41, at a predetermined time in its cycle of rotation, is adapted to engage a cam roller 60, mounted upon a reciprocable slide 61, which is slidably mounted in ways 62 fixed to the underside of the main base member 21. The slide 61 has fixed to it an actuator rod 63, the left end of which (Fig. 9) slides in the front plate 24 and a bearing member 64 fixed to the front plate 24.

Extending through the actuator rod 63 are a pair of pins 65 and 66, which extend beyond the circumference of the rod an appreciable distance. As shown in Fig. 9, the pin 66 is engaging an abutment plate 67, through which the rod 63 extends and against which a compression spring 58 bears. The right end of the compression spring 58 (Fig. 9) bears against the slide 61 and urges the slide 61 to the right (Fig. 9), the pin 66 preventing movement of the slide 61 beyond the position shown in Fig. 9. The actuated bar 63, upon being reciprocated under the action of the cam 41 and spring 58, controls the alternate operation of pawls 68 and 69 (Figs. 9, 10 and 11) through bell crank levers 70 and 71, respectively. Extending downwardly from the underside of the main base member 21 are blocks 72 and 73 on the underside of which the bell crank levers 70 and 71, respectively, are pivoted by means of pivot pins 74 and 75. The blocks 72 and 73 also serve as journals for supporting a rock shaft 76, on which the pawls 68 and 69 are mounted. The pawls 68 and 69 are freely rotatable about the rock shaft 76, being urged to rock in a clockwise direction (Fig. 10) about the shaft 76 by springs 77 and 78, respectively. In addition to the pawls 68 and 69, the rock shaft 76 has supported on it, and fixed to it, a pair of reset levers 79 and 80. The reset levers 79 and 80 are pinned to the rock shaft 76 by pins 81 and 82, respectively. The rock shaft 76 also has an actuating handle 83 fixed to it so that the rock shaft 76 may be rocked counter-clockwise (Fig. 10) to bring the left ends (Fig. 10) or right ends (Fig. 11) of the levers 79 and 80 into engagement with pins 84 and 85 mounted on the pawls 68 and 69, respectively, to rock the pawls against the tension of their respective springs 77 and 78 and release the pawls from teeth 86 formed on a rack 87. The shaft 76 is normally urged to rotate in a clockwise direction (Fig. 10) by a spring 88 fixed to the left end (Fig. 11), the right end (Fig. 10), of reset lever 80 and to a pin 89 fixed in the front plate 24. The ends of the levers 70 and 71 associated with the pins 65 and 66 are forked to extend around the actuator rod 63 and the ends of the other arms of the bell crank levers 70 and 71 are formed to engage the downwardly projecting arms of the pawls 68 and 69, which are also bell crank levers. Thus, when the actuator rod 63 is moved toward the rear of the machine, the pin 65 will engage bell crank lever 70 to rock it about its pivot pin 74 and cause the rearwardly extending arm of bell crank 70 to engage the downwardly projecting portion of the pawl 68 to remove the pawl from engagement with the teeth 86 on the rack 87, as shown in the drawings. This will permit the pawl 69 to be rocked by its spring 78 to carry the upwardly extending end of the pawl into the teeth of the rack due to the fact that the pin 66 will no longer be engaging the forked portion of bell crank lever 71. Thus, alternate rocking of bell crank lever 70 and 71, due to the engagement thereof by pins 65 and 66, will alternately remove pawls 68 and 69 from engagement with the teeth 86 of the rack 87 and to permit the rack to be moved step by step across the face of the machine.

The rack 87 is mounted on the underside of the carriage 30 and the carriage is dove-tailed to fit into a dove-tail notch 90 and under dove-tail locking plate 91. In this manner, the carriage 30 is slidably positioned with respect to the plate 21 and may travel across the front of the machine. The right end (Fig. 2) of the carriage 30 has a spring-pressed plunger 92 fixed to it which extends outwardly to the right beyond the edge of the main base member 21 and has fixed to its extreme right end a plate 93. Surrounding the plunger 92 is a compression spring 94 which bears against the plate 93 and an abutment 95 fixed in a tubular casing 96. The casing 96 may be fixed on the table 27 by suitable brackets 97 and 98, which support it in position with respect to the main base member 21 so that the spring 94 will normally urge the carriage 30 to the right through the action of the plunger 92. The carriage 30 is adapted to receive either of two fixtures 99 or 100, as shown in Figs. 7 and 9 or 16 and 17, depending upon the article which is to be assembled in the apparatus, that is, depending upon whether a plug or jack is being partially assembled in the apparatus.

The apparatus, as shown in most of the views, is arranged to assemble a plug and, accordingly, the plug fixture 99 is shown mounted on the carriage 30. The plug fixture 99 comprises a base plate 110 (Figs. 7, 9 and 10) which may be secured to the carriage 30 by screws 111. It will be understood that the same screws which hold the fixture 99 on the carriage 30 may be utilized for attaching the fixture 100 to the carriage. The base plate 110, as most clearly shown in Figs. 7 and 9, has extending upwardly from it a vertical extending member 112 which extends across the mid portion of the base plate 110 and has a portion 113 extending horizontally from it. The portion 113 is provided with a pair of horizontally extending pins 114, on which a main insulator member 115 of a plug may be mounted. The main insulator member 115 of the plug is made of wood and is provided with both vertically extending and horizontally extending slots 116 and 117 (Fig. 7), which communicate with each other to receive two metallic connector members 118 and 119 and an interposed insulator member 120, the configuration of which is most clearly shown in Figs. 3, 5, 12 and 14. In the operation of the apparatus, the metallic connector members 118 and 119 and the insulator member 120 are picked from their respective magazines and advanced into the slots 116 and 117, where they are assembled with the main insulator member 115. After all of the connector members and insulators have been assembled on the main insulator member 115, a pair of screws 121 at the opposite ends of the jack may be inserted through aligned holes in member 115 and in an insulating plate 122 and threaded into retainer plate 123, whereupon the main insulator member with the connectors and insulators may be removed from the pins 114 and screws 122 may then be passed through the holes into which the pins 114 had extended and these screws 122 also may be threaded into the retaining bar 123 to thus completely assemble the plug.

In assembling the jack due to the irregular configuration of the metallic connector members of the jack, a more complicated fixture 100 must be provided and this fixture comprises a pair of blocks 130 (Figs. 16 and 17) which may be attached to the carriage 30 by the screws 111. Extending across the top of the blocks 130 is a plate 131 having a pair of L-shaped members 132 and 133 fixed to it by means of screws 134. The horizontally extending portion of the L-shaped members 132 and 133 are provided with apertures 135 and 136, respectively, for receiving a threaded rod 137. The rod 137 extends through a series of spacers 138 and 139 and clamping springs 140 and 141 to hold the springs 140 and 141 in position to clamp metallic connector members 143 and 144 and insulator members 145 in position to have a main insulating member 148 (Figs. 4 and 6) assembled with them. The plate 131 has extending upwardly from it a series of partitions 146, which cooperate with the springs 140 and 141 to hold the assembled connector members 143 and 144 and the insulator member 145 in their proper position relative one to another. A series of slots 147 are formed in the plate 131 to receive the downwardly extending portions (Fig. 17) of the connectors 143 and 144 and insulators 145. After the insulators 145 and connector members 143 and 144 have been assembled in position between the partitions 146 and the springs 140 and 141, the main insulating member 148, as shown in dot and dash lines (Fig. 17) may be assembled with the connector members and insulators. After the main insulator member 148 has been placed in the position shown in Fig. 17, any suitable tool may be passed under the horizontally extending portions of the connector members to lift them and the main insulator member 148 from fixture 100 and hold the parts in proper position while an insulator plate 149 and retainer plate 150 may be connected to the main insulator member 148 by means of screws 151, thereby to hold the assembled parts in their proper position. The plugs and jacks thus formed may be used in the manner shown in Fig. 6, wherein the plug is shown in dotted lines interconnecting its connector members with those of the jack shown in solid lines.

The apparatus for feeding either the metallic connector members 118 and 119 and insulator member 120 or the metallic connector members 143 and 144 and insulator members 145 to either the main insulator member 115 or the fixture 100 includes the magazines 28 and 29 and the plunger mechanism 31, as most clearly shown in Figs. 2, 7 and 12 to 15. In Figs. 2, 7, 12 and 14, the apparatus is shown arranged to feed plug parts for assembling a plug. It will be understood, however, that by placing the fixture 100 on the carriage 30 instead of the fixture 99 and by placing spacers 160, 161 and 162, as shown in Figs. 13 and 15, in the magazines, the apparatus may be adapted to assemble jacks.

The magazine 29, which is adapted to feed the right hand connector member 119, comprises a trough 163 formed at the top edge of a frame member 164, which is, in turn suitably supported on the main base member 21. A spring 165 (Fig. 1) surrounding a rod 166 normally urges a slidable block 167 to move downwardly and the block 167 has a projecting portion 168 (Fig. 14) extending through a slot 169 in the trough 163 and carries at its upper end a pusher 170, which, in turn, bears against a supply of connector members 119 positioned in the trough, normally urging the connector members 119 to move downwardly in the sloping trough 163. Similarly, the magazine 28 (Figs. 1, 2, 7 and 12) comprises a supporting frame member 175 on the upper edge of which are formed a pair of troughs 176 and 177, in which the connector members 118 and insulator members 120 may be positioned. The supply of connector members 118 and insulator members 120 are urged downwardly in the troughs 176 and 177, respectively, by pushers 178 and 179 mounted on the upper ends of extending portions 180 and 181 of slidable blocks 182 and 183, respectively. The blocks 182 and 183 are urged downwardly by springs 184 and 186, and ride on rods 185 and 186. Thus, the supply of connector members 118 and 119 in the guides 163 and 176 and the supply of insulator members 120 in the trough 177 are all urged downwardly in their respective troughs toward the center of the apparatus to a position most clearly shown in Figs. 7 and 9.

The insulator member 120 closest to the center of the apparatus will abut against upper and lower guide portions 190 and 191. The guide portion 190 is formed on the underside of a Z-shaped guide bracket 192 (Figs. 7, 9 and 18), which is fixed on a support plate 193, in turn mounted upon the main base member 21. The support plate 193 has extending upwardly from it a series of four guide posts 194, 195, 196 and 197 (Figs. 7 and 8) which serve to guide the insulator member 120, connector member 118 and the assembling plunger 47. A pin 198 extending downwardly from the Z-shaped bracket 192, as most clearly shown in Fig. 18, prevents the insulator member 120 from tilting as it is pushed forward by the plunger 47. As the insulator member 120 is pushed to the left (Fig. 9) by the plunger 47 in the operation of the machine, its lower surface enters into position between a pair of guide rails 199 and 200, which are formed integrally with a block 201 set into the support plate 193, a suitable aperture being formed in the support plate 193 for receiving the block 201.

As will be seen, by reference to Fig. 7, the guide rails 199 and 200 direct the insulator member 120 slightly toward the right and into position between the innermost connector members 118 and 119, which rest against the outer surfaces of the guide rails 199 and 200, where they are in the path of the square end of the plunger 47. The upper or terminal ends of the connector members 118 and 119 are bent over, as shown in Fig. 19, and may bear against guide members 202 and 203 formed on the underside of a plate 204. The guide members 202 and 203 define a slot 205, in which the upper end of the insulator member 120 will be guided when it is moved in position between the contactor members 118 and 119. The plate 204 is fixed on a support block 206 which is mounted on a support member 207, which is, in turn, mounted on the support plate 193. A spring 209 (Fig. 7) is fixed to the block 204 by means of the screws 210 and serves the double purpose of urging a plunger 211 toward the center of the machine and cooperating with a spring 212 fixed on a guide block 213 to strip the connector members 118 and 119 and insulator member 120 from the plunger 47 if they tend to adhere thereto. The plunger 211 presses the group comprising the conductor members 118 and 119 and the insulator member 120 against the block 213 to guide them into the slots 116 and 117 on the main insulating member 115.

When jacks are being assembled, the spacer members 160, 161 and 162 (Figs. 13 and 15) may be placed in the troughs 176, 177 and 163, respectively, and the connector members 143 and 144 and insulator member 145 may then be fed through the path described for the connector members 118, 119 and the insulator member 120 and will be pushed into engagement with the springs 140 and 141 on the fixture 100.

In the operation of the apparatus when plugs are to be assembled, a supply of connector members 118 and 119 and a supply of insulator members 120 having been placed in the troughs 176, 163 and 177, respectively, and a main insulating member 115 having been placed on a fixture 99 mounted on the carriage 30, the actuating handle 83 may be depressed while the carriage 30 is moved to its extreme left-hand position and then the actuating handle 83 may be released. The handle 83, when released, will permit the pawls 68 and 69 to engage the teeth 86 of the rack 87. With the apparatus in this condition, power may be supplied to drive the shaft 40 through any suitable circuit connections or other control means (ont shown). As the shaft 40 rotates, it will impart a rotation to the eccentric plate 42, thereby to reciprocate the sleeve of 46. As the sleeve 46 reciprocates, the plunger 47 will tend to follow it due to the action of the springs 50 and 51 tending to hold the handle 53 against the sleeve 46. As the plunger 47 is thus reciprocated, it will, each time it moves toward the front of the machine, pick the innermost insulator member 120 from the magazine 28 and advance it between the guide rails 199 and 200 into position between the innermost connector members 118 and 119. As the plunger 47 continues toward the left (Fig. 9), it will pick the two innermost connector members from the magazines 28 and 29 and advance them simultaneously with the insulator member 120 between the springs 209 and 212 and into the right-hand slot 116 on the main insulating member 115. As soon as the plunger 47 has pushed the two connector members and insulator member 120 into the slot 116, it will be retracted and, during its retraction, the cam 41 will strike the roller 60 and move the actuator rod 63 to the left (Fig. 9). As the actuator rod 63 moves to the left (Fig. 9), the pins 65 and 66 carried with it will disengage from and engage with bell crank levers 70 and 71, respectively. When the pin 65 moves toward the front of the apparatus (upwardly, as viewed in Fig. 11), the spring 77 will be permitted to rock the pawl 68 into engagement with the teeth 86. As the actuator rod 63 continues to move toward the front of the machine (upwardly, as viewed in Fig. 11), the pin 66 will engage bell crank 71 to rock it clockwise (Fig. 11) and thereby remove pawl 69 from engagement with the teeth 86 of rack 87. Thus, the spring 94 (Fig. 2) will be permitted to step the carriage 30 to the right (Figs. 2, 7 and 10) until a tooth 86 engages the pawl 68. As soon as the cam 41 disengages from the cam roller 60, the spring 58 will force the actuator rod 63 to the right (Fig. 9) downwardly (Fig. 11) to disengage the pin 66 from bell crank 71 and move the actuator rod 63 to the position shown in Fig. 11, where the pin 65 thereon is engaging the bell crank lever 70, which, in turn, disengages the pawl 68 from the teeth 86. With the apparatus in the just-described position, the second slot 116 from the right of the main insulating member 115, as viewed in Fig. 7, will be in alignment with the plunger 47 to receive connector members and an insulator member on the next forward stroke of the plunger 47. The just-described operations will continue until all of the slots 116 have been supplied with connector members and insulators, at which time the operation of the shaft 40 may be interrupted by any suitable means and the cycle of operations repeated.

When the apparatus is operated for assembling jacks, the sequence of operations of the various moving parts thereof will be exactly the same as described for assembling plugs, but in place of the fixture 99, the fixture 100 will be mounted on the carriage 30 and the connector members 143 and 144 and insulator member 145 will be assembled in position on the fixture, after which a main insulator member 148 may be assembled with them as shown by the dot and dash lines in Fig. 17. Thus, the apparatus is adapted to make either a plug or a jack for cooperation one with another in the manner illustrated in Fig. 6.

What is claimed is:

1. An apparatus for bringing together two conductor members and an intermediate insulator member and placing them in a receiver, said apparatus comprising a support for a receiver, a plunger, means mounting said plunger for movement toward and away from said support, means for moving the plunger, said plunger having a leading transverse surface to engage and move an insulator member and two conductor members into a receiver, a magazine for a supply of insulator members having a terminal dispensing end situated adjacent the path of movement of the plunger and constructed to present an insulator member in such path to be engaged and moved by an edge of the transverse surface of the plunger, two magazines providing two supplies of conductor members having their terminal dispensing ends situated on opposite sides of the path of movement of the plunger and constructed to present conductors in adjacent but spaced relation to be engaged and moved by opposite edges of the transverse surface of the plunger after said plunger has passed said insulator magazine, and guide means extending between said insulator magazine and said conductor magazines constructed to guide an insulator transversely of said path of movement from a position adjacent the edge of said transverse surface to a position centrally of said transverse surface and into the space between the terminally held conductors, as said plunger moves toward said support.

2. An apparatus for bringing together two conductor members and an intermediate insulator member and placing them in a receiving location, said apparatus comprising reciprocating means movable in a predetermined path and having a leading transverse portion to engage and move an insulator member and two conductor members to said receiving location, a supply magazine for insulator members having a terminal dispensing end and constructed to present an insulator member in such path to be engaged and moved by an edge of said transverse portion, a plurality of supply magazines for dispensing conductor members at opposite sides of the path of movement of said transverse portion to be thereafter engaged and moved by said transverse portion, and guide means extending between said insulator and said conductor magazine dispensing ends for deflecting an insulator transversely of said path of movement from its position adjacent the edge of said transverse portion and into the space between the conductors, as said reciprocating means moves toward said receiving location.

3. In an apparatus for assembling conductor members and an insulator member in interleaved relationship and placing them in a receiver, a carriage for supporting the receiver, reciprocable means having a leading transverse portion for engaging and moving an insulator member and a plurality of conductor members to the receiver, means for dispensing an insulator in the path of the transverse portion to be engaged and moved thereby, means for dispensing a plurality of conductor members at opposite sides of the path of movement of said transverse portion to be engaged and moved thereby, means for guiding the insulator member in between the conductor members as the reciprocating means moves toward the receiver, and means for moving the carriage step by step to place the assembled units of conductor members and insulator member in predetermined positions in the receiver.

4. An apparatus for bringing together two conductor members and an intermediate insulator member and placing them in a receiving location, said apparatus comprising reciprocating means movable in a predetermined path and having a leading transverse portion to engage and move an insulator member and two conductor members to said receiving location, a supply magazine for insulator members having a terminal dispensing end and constructed to present an insulator member in such path to be engaged and moved by an edge of said transverse portion, a plurality of supply magazines for dispensing conductor members at opposite sides of the path of movement of said transverse portion to be thereafter engaged and moved by said transverse portion, guide means extending between said insulator and said conductor magazine dispensing ends for deflecting an insulator transversely of said path of movement from its position adjacent the edge of said transverse portion and into the space between the conductors, as said reciprocating means moves toward said receiving location, and means adjacent the dispensing ends of the several supply magazines for blocking movement by the reciprocating means of all of the insulator and conductor members in the magazine except the end member in each magazine.

5. An apparatus for bringing together two conductor members and an intermediate insulator member and placing them in a receiving location, said apparatus comprising reciprocating means movable in a predetermined path and having a leading transverse portion to engage and move an insulator member and two conductor members to said receiving location, a supply magazine for insualtor members having a terminal dispensing end and constructed to present an insulator member in such path to be engaged and moved by an edge of said transverse portion, a plurality of supply magazines for dispensing conductor members at opposite sides of the path of movement of said transverse portion to be thereafter engaged and moved by said transverse portion, guide means extending between said insulator and said conductor magazine dispensing ends for deflecting an insulator transversely of said path of movement from its position adjacent the edge of said transverse portion and into the space between the conductors, as said reciprocating means moves toward said receiving location, and means adjacent the terminal dispensing end of each magazine for positioning the end member in the magazine for engagement by the reciprocatory member.

6. An apparatus for bringing together two conductor members and an intermediate insulator member and placing them in a receiving location, said apparatus comprising reciprocating means movable in a predetermined path and having a leading transverse portion to engage and move an insulator member and two conductor members to said receiving location, a supply magazine for insulator members having a terminal dispensing end and constructed to present an insulator member in such path to be engaged and moved by an edge of said transverse portion, a plurality of supply magazines for dispensing conductor members at opposite sides of the path of movement of said transverse portion to be thereafter engaged and moved by said transverse portion, and guide means extending between said insulator and said conductor magazine dispensing ends for deflecting an insulator transversely of said path of movement from its position adjacent the edge of said transverse portion end into the space between the conductors, as said reciprocating means moves toward said receiving location, said guide means comprising plates positioned above and below the members being moved and carrying insulator member and conductor member guiding projections extending downwardly and upwardly therefrom, respectively.

WALTER R. SAMSON.